Patented May 6, 1941

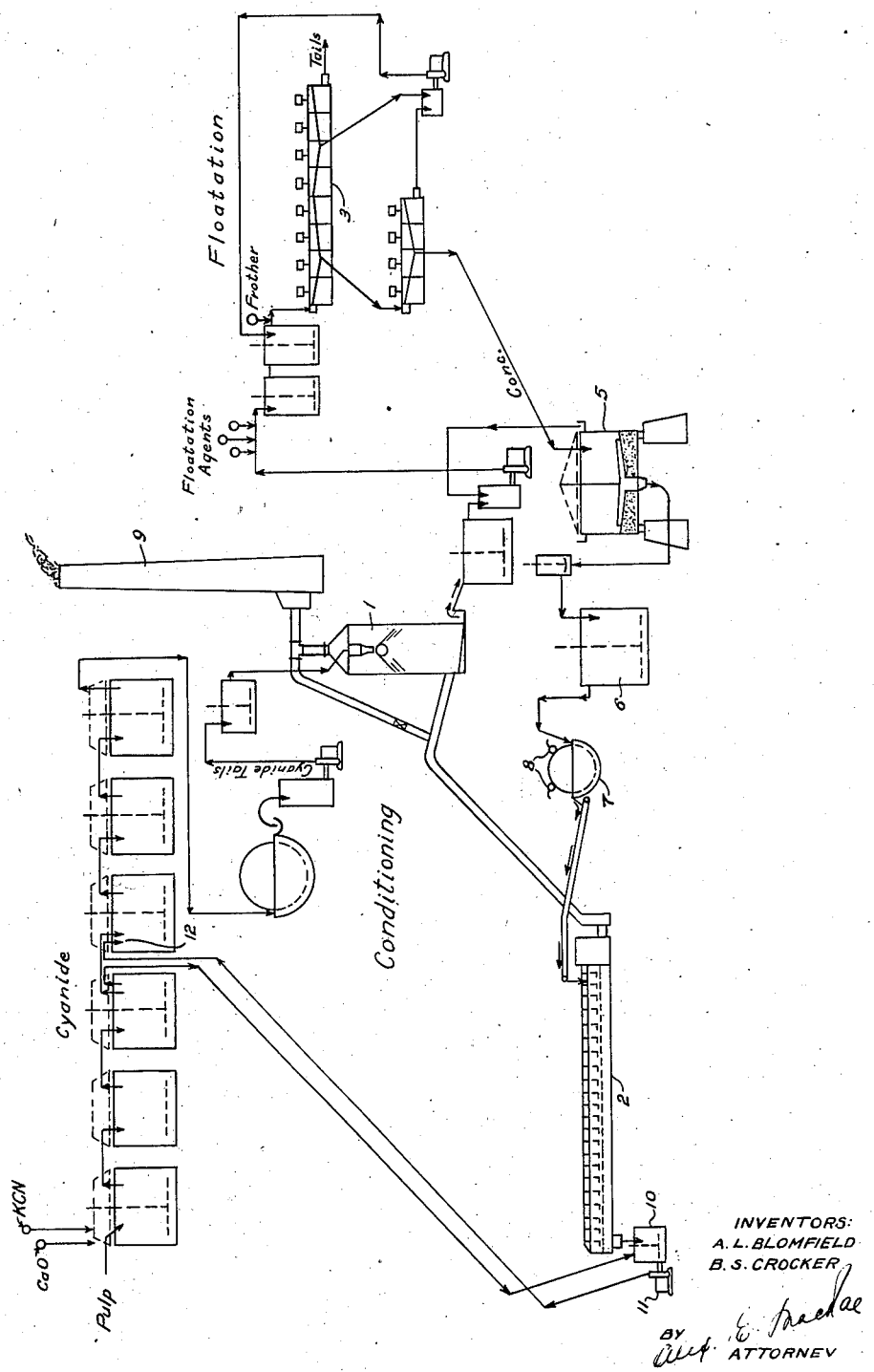

2,240,976

UNITED STATES PATENT OFFICE

2,240,976

FLOTATION SEPARATION OF MINERALS

Alfred Leslie Blomfield and Bunting Snowball Crocker, Kirkland Lake, Ontario, Canada, assignors to Lake Shore Mines Limited, Kirkland Lake, Ontario, Canada Application November 8, 1940, Serial No. 364,780
In Canada November 28, 1938

6 Claims. (Cl. 75—2)

This invention relates to the flotation method for the separation of minerals and is more particularly directed to the conditioning of the mineral pulp to be subjected to flotation in order to overcome the effect of constituents of the pulp which hinder flotation.

Broadly the invention comprises the step of treating the mineral pulp with a roaster gas, preferably formed by the roasting of the concentrates produced by flotation, with a view to overcoming the depressing effect upon flotation of undesirable materials in the pulp.

The invention will be described in relation to the treatment of cyanide tails and with reference to the accompanying drawing which illustrates a flow sheet of a combined flotation and roasting process.

It will be observed that the tailings from the cyanide treatment are conditioned with roaster gases, floated, roasted and returned to be incorporated in the pulp undergoing cyanide treatment for extraction therefrom of gold, or other recoverable values, along with at least a portion of the extraction from the ore itself. A portion of the ore pulp is preferably withdrawn from the cyanide unit and incorporated with the roaster calcines, as indicated, and the mixture is returned to the cyanide unit at a point to allow sufficient cyanide contact to recover the values from the calcines.

In operation the cyanide tailings, as indicated in the flow sheet, or such other ore product as is to be treated, in pulp form is passed through one or more splash or absorption towers 1, preferably in counter-current to the flow of gases from a roaster 2. Various types of splash or absorption towers may be used. In that illustrated the pulp enters at or near the top and is sprayed through a nozzle, or caused to impinge upon a ball or the like located within the tower chamber to disperse the pulp. The pulp spray should contact the walls of the chamber to insure passage of the roaster gases, which are shown as entering adjacent the bottom of the tower, through the pulp and in sufficiently intimate contact therewith to permit the desired pulp conditioning reactions. The pulp preferably flows from the bottom of the tower providing a gas seal as shown.

The pulp may be further conditioned and subjected to agitation, as required, with the addition of desired flotation or frothing agents such as, copper sulphate, xanthates, pine oil or the like, and then passed, by means of a pump or the like, through flotation cells 3 as in usual practice. The flotation tails are discarded as indicated and the concentrates are thickened 5, agitated 6, and passed through a filter 7, preferably equipped with so-called flappers 8 adapted to beat the filter cake to decrease its moisture content. The thus dried concentrate passes to the roaster 2 from which a controlled portion of the roast gases is conveyed through the reaction tower 1, the balance going directly to the stack 9 for discharge to the atmosphere as indicated.

The roasted flotation concentrate is cooled, preferably in the roaster 2, mixed 10 with a portion of the partially treated cyanide pulp and pumped 11 back to the cyanide unit at a point 12, approaching the end of the cyanide treatment, say eight hours before the end of a forty-eight hour treatment. Thus the gold or other value remaining in the calcines is recovered during the final period of the ore treatment.

It will be apparent that cyanide tailings contain lime and cyanide. It is known that these reagents interfere with efficient flotation. The adverse effect of such constituents of the pulp is overcome by the treatment with roaster gas, which changes them to a form which is not deleterious to flotation. The lime is perhaps changed to sulphites or sulphates by the sulphur dioxide in the roaster gas and the cyanide is rendered harmless.

The method is applicable to all cyanide tailings and may be applied to any pulp to be treated by flotation. The cost of treating low grade ores, or the retreatment of tailings and the like, is the determining factor in the commercial possibilities of such mineral products. The present method is particularly economical, effecting a substantial saving in reagent costs and provides an improved more or less cyclical procedure wherein flotation concentrates are used to provide conditioning reagents for the pulp and the roasted concentrates are returned for further cyanide treatment to recover remaining values.

We claim:

1. A method of recovering values from ore products which includes successively cyanide treatment, concentration of the cyanide tailings by flotation, and roasting of the concentrates, characterized in that the pulp formed from the cyanide tailings for flotation is treated with the gases formed by roasting the flotation concentrates.

2. A method as defined in claim 1, wherein the roasted concentrates are returned to the cyanide circuit for retreatment.

3. A method of recovering metals from cyanide tailings which comprises forming a pulp therefrom, treating the pulp with roaster gases, subjecting the so-treated pulp to flotation and roasting the flotation concentrates to provide the gases for conditioning said pulp.

4. A cyclic method of recovering metals from ore which comprises treating the ore with cyanide, subjecting the cyanide tailings to the action of roaster gases, treating the so-conditioned tailings to concentration by flotation, roasting the flotation concentrates to provide said roaster gases and returning the calcined concentrates to the cyanide circuit.

5. A method as defined in claim 3, wherein the pulp is passed through an absorption tower in counter-current flow to said roaster gases to provide intimate contact between the pulp and the gases.

6. In the cyanide treatment of metal ores, the method which comprises subjecting the cyanide tailings in the form of a pulp to the action of gases formed by roasting at least a portion of the ore to condition the pulp for flotation treatment and thereafter subjecting the so conditioned pulp to froth flotation treatment to recover metal values from said tailings.

BUNTING SNOWBALL CROCKER.
ALFRED LESLIE BLOMFIELD.